United States Patent [19]

Moschetti

[11] 4,178,875

[45] Dec. 18, 1979

[54] APPARATUSES FOR PRODUCING TIGHT JOINTS OR SEALS IN UNDERGROUND PIPELINES

[75] Inventor: Armando Moschetti, Milan, Italy

[73] Assignee: Siargas — Societa' Italiana Assistenza Reti Gas S.p.A., Milan, Italy

[21] Appl. No.: 856,577

[22] Filed: Nov. 30, 1977

[30] Foreign Application Priority Data

Nov. 15, 1977 [IT] Italy .................. 29709 A/77

[51] Int. Cl.$^2$ .............................................. B05C 11/00
[52] U.S. Cl. ...................... 118/712; 118/254; 118/306; 118/408; 118/DIG. 10; 118/670; 427/236; 427/239
[58] Field of Search ............... 118/DIG. 10, 8, 2, 306, 118/408, 254; 427/239, 236

[56] References Cited

U.S. PATENT DOCUMENTS

| | | | |
|---|---|---|---|
| 2,108,319 | 2/1938 | Perkins | 118/DIG. 10 |
| 3,017,855 | 1/1962 | Ranker | 118/306 |
| 3,106,491 | 10/1963 | Leibner | 118/2 |
| 3,245,824 | 4/1966 | Treat et al. | 118/306 X |
| 3,703,947 | 11/1972 | Landrum | 118/408 X |
| 3,878,811 | 4/1975 | Rombach | 118/2 |
| 3,886,893 | 6/1975 | Takeuchi | 118/2 |
| 3,960,644 | 6/1976 | McFadden | 118/306 X |
| 4,058,258 | 11/1977 | Rosen et al. | 118/306 X |
| 4,092,950 | 6/1978 | Hart | 118/306 X |

Primary Examiner—Shrive P. Beck
Attorney, Agent, or Firm—Mason, Fenwick & Lawrence

[57] ABSTRACT

A method of rejoining seals at joints in underground pipelines comprises moving a carriage inside a pipeline beyond a joint to be reformed and rapidly spraying a synthetic polymerizable material to cover the joint from a spraying head mounted on the carriage and displaced relatively slowly with respect thereto. The carriage has means for propelling it on rolling members, for anchoring it in the pipeline, and for moving an arm on which the spraying head is mounted.

9 Claims, 4 Drawing Figures

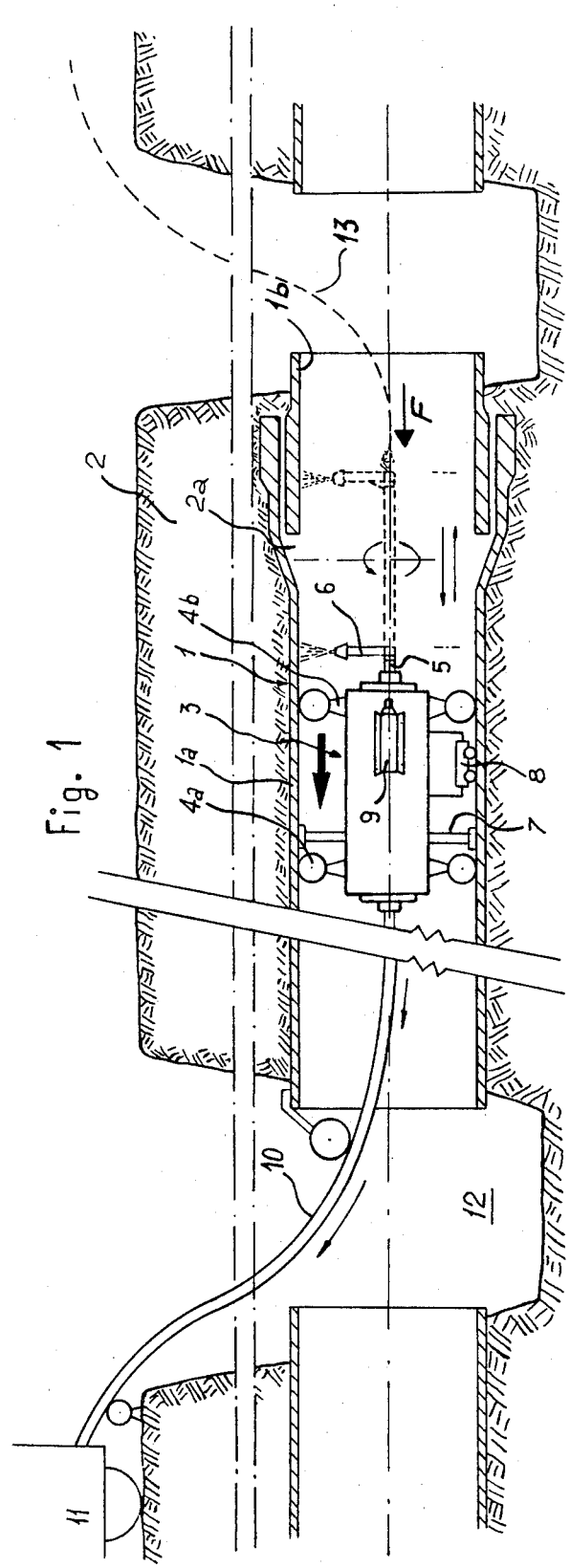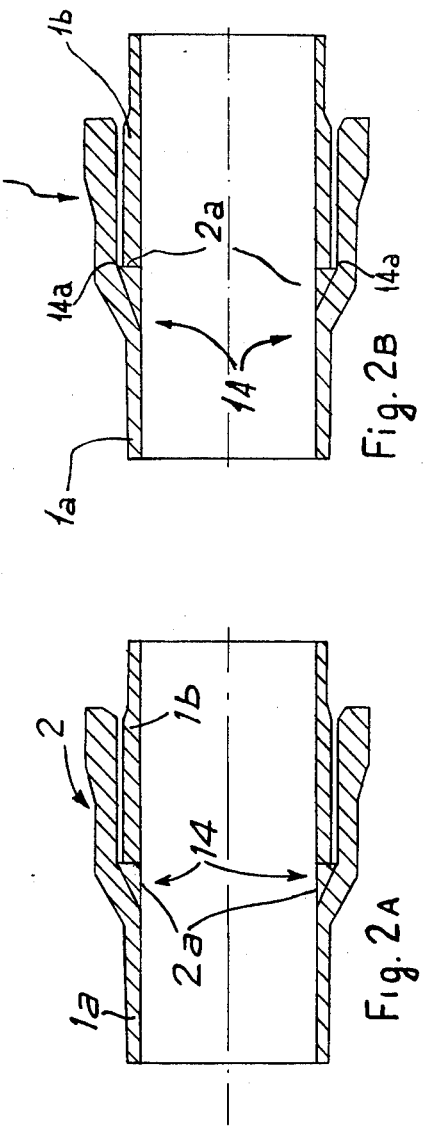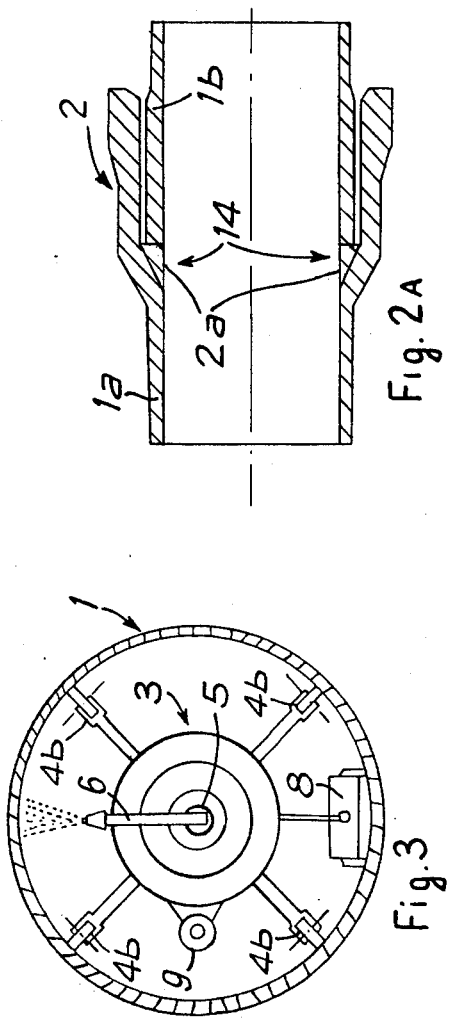

APPARATUSES FOR PRODUCING TIGHT JOINTS OR SEALS IN UNDERGROUND PIPELINES

The invention relates to methods of and apparatuses for producing tight joints or seals in underground pipelines. It has been found that some underground pipelines generally made of pig iron, in particular those belonging to an old natural or town gas pipe network, have leaks at the junctions of the pipe sections forming the pipeline, owing to deterioration of the joints formed when the gas pipeline was laid.

The overall effect of such leaks is considerable and it would be very desirable from the economical point of view to eliminate them. Among the methods known at present of rejoining underground pipes, one method includes arranging a sleeve of reinforced polymerizable material on a mandrel, the polymerizable material being pre-catalysed before being applied to the mandrel, inserting the thus equipped mandrel into the pipeline and bridging the joint to be sealed, and finally inflating the sleeve so as to apply its outer surface against the inner surface of the pipeline, polymerization ensuring sticking of the sleeve to the pipeline. This method has a number of drawbacks both insofar as the time required for carrying it out and the results obtained with it are concerned. For example, it will be noted that a joint obtained in this manner does not perfectly follow the inner surface of the pipeline especially when two pipe sections are offset with respect to each other or have different thickness. Consequently, empty spaces exist between the sleeve and the pipeline, which delimit weak points and are likely to give rise to new leaks should the pressure inside the pipeline exceed a given value. Furthermore, the mandrel remains immobilized for a space of time in the pipeline to start a good polymerization process which is completed only after a few days. Withdrawal of the mandrel involves applying the mandrel against the sleeve freshly produced and not completely polymerized with all the risks of deterioration that this implies.

According to one aspect of the invention there is provided a method of producing a tight-sealed joint at a pipe section junction in a pipeline, comprising the steps of cleaning the said pipe sections, moving a spraying source, not energized, of synthetic polymerizable material rapidly along the pipeline to effect an approaching movement until the presence of a joint is detected, stopping the said source beyond the joint in the direction of movement, forming a sleeve at the joint on both sides thereof by covering the inner surface of adjacent ends of pipe sections joined together by supplying at a constant flow rate a spraying head carried by the said source with the said polymerizable material catalized while being sprayed, and displacing the said head at a variable and adjustable slow speed with respect to the said source.

A preferred method allows the production of light seals at the joints of pipe sections in a pipeline, in particular in an underground pipeline.

In a preferred method of re-forming seals in an underground pipeline, there is obtained mechanically sturdier seals which substantially perfectly fit the inner shape of a joint in a pipeline and this is a more rapid way.

In a preferred method, after cleaning of the said pipe sections, a spraying source, not energized, of synthetic polymerizable material is rapidly displaced along a pipeline until the presence of a joint is detected, the said source is stopped beyond the joint in the displacement direction, a sleeve is formed all along the joint, the inner surface of the ends of the pipe sections adjacent to the joint is coated by energizing a spraying head carried by the said source to spray at a constant flow rate, the said polymerizable material being catalized while being sprayed, and the said head is given a slow and adjustable reciprocating movement with respect to the said source.

A preferred method makes it possible to obtain, advantageously at right angles, junctions in undergrounds pipes owing to intermittent operation and displacement at variable speeds of the spraying head, which makes it possible to obtain variable-thickness sleeves which substantially perfectly fit in the inner cavity formed at the junction of two pipes. Furthermore, at the joints of socket pipes the thickness of the sleeve takes the form of a fillet forming a tight lining against which the inner pressure of the pipeline acts thereby increasing adherence and tightness thereof.

According to another aspect of the invention there is provided an apparatus for performing the method according to the invention, comprising a carriage externally provided with at least two angularly spaced sets of radially extending rolling members, retractable radially extending anchoring means for resting against the inner surface of the pipeline, a spraying head connected to reservoirs of synthetic components and arranged at the end of a longitudinal support which is slidably mounted on the carriage, first driving means for rapidly moving the carriage, actuating means for the anchoring means, and second driving means for longitudinally displacing the support with respect to the carriage.

The invention will be further described, by way of example, with reference to the accompanying drawings, in which:

FIG. 1 is a diagram illustrating a preferred method and apparatus;

FIG. 2A is a cross-sectional view of a theoretical profile of a joint produced according to the preferred method;

FIG. 2B shows the actual configuration of this joint; and

FIG. 3 is a diagrammatic view in the direction of arrow F of FIG. 1.

With reference to FIGS. 1 and 3, a pipe line 1 comprises two pipe sections 1a and 1b joined at 2 by means of a so-called "socket joint" connection. It will be assumed that the sealing member arranged in the joint while laying the pipeline has partially disappeared, which is the cause of a leak. A carriage 3 is placed in the pipeline, the carriage being equipped with radially extending rolling members which are grouped in two sets 4a and 4b in the drawing. The rolling members may be provided in larger number and at least some of them are mounted on resilient members so as to positively rest against the inner surface of the pipeline and to ensure centring of the carriage in the pipeline at the same time.

The carriage 3 also has at one of its ends a longitudinal support 5 and a spraying head 6 for spraying a synthetic polymerizable material. In the embodiment shown, the support 5 is formed by the piston rod of a hydraulic jack the cylinder of which is fixed to the carriage 3. The piston rod can be longitudinally displaced with respect to the carriage 3 under the action of hydraulic pressure. The said support 5 too may be formed by a member which can slide under the effect of a mechanic control.

The carriage 3 also comprises anchoring means 7, e.g. formed by two radially extending shoes adapted to be forced against the inner wall of the pipeline under the action of an hydraulic, pneumatic, or mechanic mechanism. These means may also be retracted to free the carriage with respect to the pipeline for withdrawal.

It will be noted that the carriage 3 carries a probe 8 for detecting joints, i.e. breaks in the continuity of the pipeline. The probe can generate electromagnetic, or optical, or ultrasonic waves, or be formed by a mechanical sensor. Finally a device 8 for observing a finished operation or an operation being carried out is disposed on the spraying head side and may comprise for example a television camera connected to an inner circuit.

The reference numeral 10 indicates a bundle of flexible cables, hoses, or electric wires for supplying power or polymerizable material to an apparatus inserted into the pipeline 1. This bundle is connected to power sources and control and monitoring apparatuses generally indicated by 11 located at the ground surface. Finally, an excavation is indicated by 12 through which the preferred apparatus is inserted into the pipeline and the bundle 10 extends in operation. Usually, a second excavation, not shown, is dug at the other end of the length of pipeline to be repaired, through which a bundle 13 can pass.

The carriage 3 may be of various types. The members 4a and 4b may be very simple rolling members. In this case, the bundle 10 comprises a pull cable by means of which the carriage is displaced along the pipeline. On the other hand, all or some of the members 4a and 4b may be powered by being operatively connected to a motor located on or in the carriage 3. The bundle then includes wires for supplying energy to the motor which may be an electric, hydraulic, or pneumatic motor.

The bundle also includes suitable conductors for conveying power to the anchoring means 7, as well as a conduit for supplying the jack whose support 5 is the piston rod, or any other conductor suitable for supplying the required power to a driving member controlling the movement of the support 5.

The bundle 10 also includes conductors for supplying power to a motor rotating the spraying head 6 if the latter is of rotary type, or for supplying power to eject under pressure polymerizable material through a static spraying head 6 by means of deflectors.

Furthermore, the carriage 3 itself may contain reservoirs of synthetic components of the said polymerizable material, or some of them only, the remainder being supplied via conduits extending from reservoirs located on the ground surface to the spraying head by means of specific ducts included in the bundle 10.

Finally, the bundle 10 includes conductors which connect the probe 8 and the observation device 9 to control and monitor members located on the ground surface. These members may comprise a logic system for sequentially controlling the various operations the apparatus is to perform during its displacement along the pipeline to be repaired.

Before locating the preferred apparatus in the pipeline 1, it is necessary to clean the pipeline by means of a known equipment, such as by ejection of water under pressure. The carriage 3 equipped with all its accessories is then inserted through one end of the portion of pipeline 1. The carriage is caused to displace along the pipeline at a predetermined and relatively rapid speed. When the probe 8 detects a joint 2, the carriage 3 continues moving forward for a predetermined time and then stops. The members 7 for fixing the carriage to the pipeline are then extended outwards together with the support 5, should it not be already extended. Spraying is then started by supplying the head 6 with polymerizable material at a constant flow rate while retracting the support 5. The speed of relative displacement of the said support with respect to the carriage is a function of the thickness of the layer to be formed and in particular it is lower than the speed of displacement of the carriage along the pipeline. This speed will be decreased when the support has reached a position in front of the portion 2a of the joint in order to completely fill this portion. This speed and its variations may be advantageously controlled in a predetermined way by means of a logic device in which the dimensions of the pipeline being treated have been stored, these dimensions governing the depth of the portion 2a, and thus the thickness of sealing material to be formed in that place. At the end of the retraction movement, spraying is stopped. To this end, it will be noted that it is advantageous to use a rotary spraying head whose supply of product to be sprayed will be simply cut off, while the head will continue to rotate. The polymerizable material may be a mixture of a resin or another base material and a catalyst, the mixture being formed in the spraying head itself. By keeping the head rotating after the supply has been cut off, any material affected by the catalyst will be expelled out of the head, thereby avoiding setting the material in the said head which would obstruct the head.

The observation device 9 makes it possible to check the quality of the sleeve formed during spraying and should the sprayed layer be found to be not sufficiently thick by the operator, it is possible to apply a second layer either by extending outwards the support 5, or by retrieving it a second time after having extracted it at high speed.

Once spraying has been terminated, the means 7 are released and the carriage is displaced at a relatively high speed, termed rapid approaching speed, until the next following joint is detected. A new spraying is then started at the latter joint.

FIGS. 2A and 2B show a longitudinal cross-sectional view of a theoretical and an actual configuration, respectively, of a joint 14 obtained by carrying out the preferred method and by using the preferred apparatus. FIG. 2A shows that at the zone 2a of the joint, the sealing material deeply penetrates in the joint and forms a rim 14a which reinforces the sticking effect of the sleeve thus obtained. Thus, the seal 14 has the form of a sleeve having at its middle portion a strengthening formation defining a fillet between the two pipe sections 1a and 1b of the pipeline. Thus, if an overpressure occurs in the pipeline, it would result in a reinforcement of the fillet effect thereby increasing tightness.

Besides the mechanical advantages due to the configuration of the sleeve and the way in which it is obtained, it should be noted that the invention makes it possible to use very rapidly polymerizing materials, thereby avoiding any risk of drop formation or running off of the sprayed material under the effect of gravity. It should also be noted that a freshly obtained seal is not subjected to passage of the carriage on it at the end of the operation, owing to the principle of operation of the apparatus, which avoids any premature deterioration or any damage which in the long run might result in a weak point in the seal.

Finally, the preferred method can be carried out in a highly automated manner, which makes it possible to save to a considerable extent labour in a working team.

The invention has applications in the field of maintenance of urban pipeline networks, in particular gas pipe networks, and more generally in any underground pipeline subjected to inner localized corrosion.

I claim:

1. An underground pipeline repair apparatus positionable inside an underground pipeline for producing an internal tight joint at a socket juncture between two pipes of an underground pipeline, said repair apparatus comprising a carriage, at least two angularly spaced sets of radially extendable rolling members mounted on the carriage to be engageable with the inner surface of the pipeline to support the carriage, retractable radially extending anchoring means, actuator means for said anchoring means for selectively moving said anchoring means radially to forcefully engage the inner surface of the pipeline for preventing movement of the carriage with respect to the pipeline, a plurality of reservoirs of synthetic components, a longitudinal support member mounted for axial reciprocation on said carriage and having an outer end, a spray head mounted on the outer end of the longitudinal support member, a first driving means connected to said rolling members for rapidly moving said carriage along the interior of said underground pipeline, said spraying head being connected to said reservoirs for receiving the contents thereof and second driving means for reciprocating said longitudinal support member at a variable speed when said anchoring means is in an extended position.

2. The invention of claim 1 wherein said spraying head comprises a rotating nozzle mounted for rotation about the longitudinal axis of said longitudinal support member.

3. The invention of claim 1 wherein said second driving means comprises a hydraulic piston-cylinder assembly.

4. The invention of claim 1 wherein said actuator means for said anchoring means comprises hydraulic means.

5. The invention of claim 1 wherein said first driving means comprises electric motor means.

6. The invention of claim 1 additionally including hose means connecting said carriage to an external source of a coating material component.

7. The invention of claim 1 additionally including detecting means for detecting a joint between two pipes of said underground pipeline.

8. The invention of claim 1 wherein said spraying head comprises a rotating nozzle mounted for rotation about the longitudinal axis of said longitudinal support member, said second driving means comprises a hydraulic piston-cylinder assembly, said actuator means for said anchoring means comprises hydraulic means, said first driving means comprises electric motor means and additionally including hose means connecting said carriage to an external source of a coating material component.

9. The invention of claim 8 additionally including detecting means for detecting a joint between two pipes of said underground pipeline.

* * * * *